April 23, 1968  E. W. FISHER  3,379,445
SEAL FOR AXIALLY MOVABLE ROD
Filed March 30, 1965 2 Sheets-Sheet 1

INVENTOR:
EDWARD W. FISHER
BY Robert Henderson
ATTORNEY

April 23, 1968 — E. W. FISHER — 3,379,445
SEAL FOR AXIALLY MOVABLE ROD
Filed March 30, 1965 — 2 Sheets-Sheet 2
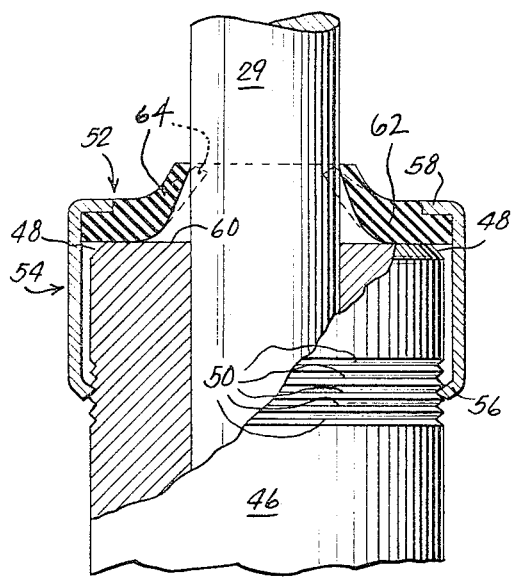
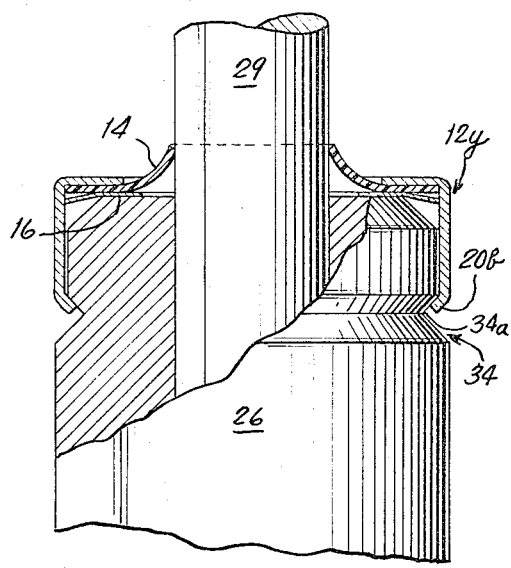
INVENTOR:
EDWARD W. FISHER
BY Robert Henderson
ATTORNEY

United States Patent Office 3,379,445
Patented Apr. 23, 1968

3,379,445
SEAL FOR AXIALLY MOVABLE ROD
Edward W. Fisher, Palmyra, N.Y., assignor to Garlock Inc., Palmyra, N.Y., a corporation of New York
Filed Mar. 30, 1965, Ser. No. 443,827
1 Claim. (Cl. 277—178)

ABSTRACT OF THE DISCLOSURE

A rod, reciprocating within a rod-guide sleeve, is provided with a seal comprising a flexible, annular sealing element through which the rod sealingly slides, the sealing element being fixed within a cup-shaped shell at a central aperture in the bottom of the shell, and the shell being held upon a free end of said sleeve by a circumferentially continuous, resilient, marginal portion of a cylindrical wall of the shell, which portion has an inturned flange engaging within an annular groove in said sleeve.

*Detailed description of this invention*

This invention relates to seals for rods which slide axially back and forth within suitable bearings or guides to operate or control the operation of a valve or other related mechanism in an arrangement wherein the seal operates to oppose or substantially prevent fluid or deleterious foreign matter from passing along the rod from one side of the bearing or guide to the other side of the latter where there is located a valve or other instrumentality which might be structurally or operationally damaged by such fluid or foreign matter.

More particularly, this invention relates to improved means for holding such a seal stationary with respect to said bearing or guide against a strong tendency of the seal to move axially because of its frictional engagement with the moving rod.

Although this invention is useful in various other ways, its virtues are well illustrated by its use on the stems of overhead poppet valves of an internal combustion engine. The invention, therefore, is described herein as employed with such valve stems without, however, limiting it to that particular use.

The upper end of an overhead poppet valve stem ordinarily works in a substantial volume or bath of oil coursing therearound. This oil, in coursing through the engine, collects minute solids, worn away from engine parts, and also collects other foreign matter. It is well known that the oil and the contaminants therein cause damage to the valve if the oil finds its way along the valve rod to the related valve element. This, in turn, gives rise to impaired engine performance.

The guides of such poppet valve stems are commonly in the form of sleeves of limited diameter which extend axially into coil springs which participate in the operation of the valve. As seals for such valve stems should preferably be located within such springs, an important attribute of such a seal is a relatively small outside diameter. Prior attempts of others to provide a small diameter rod seal and holding means therefor have not yielded satisfactory results. Those familiar with mechanical devices will realize that the mentioned requirements for poppet valves also are present in some other arrangements wherein a reciprocating rod is required to be sealed.

An important object of this invention is the provision of a seal, for a reciprocating rod, which seal is of relatively small diameter and includes improved means by which the seal, readily applied to or removed from a related rod guide, nevertheless, holds the seal firmly against dislocation from said guide.

The foregoing and other more or less obvious objects are derived from this invention of which several preferred embodiments are illustrated in the accompanying drawing without, however, limiting the invention to those particular embodiments.

In the drawing:

FIGS. 5 and 6 are similar in character to FIG. 4 but illustrate, respectively, third and fourth embodiments of this invention.

Figure 1:
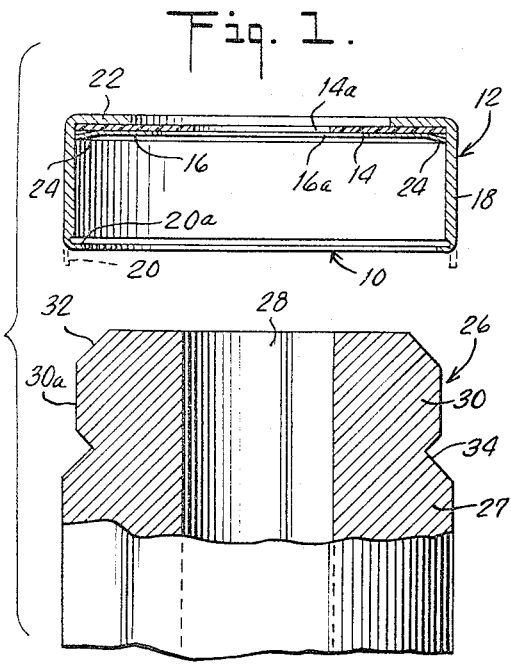
FIGURE 1 is a central, axial sectional view of a seal according to this invention, shown directly above the upper end of a valve guide in position to be applied to the latter; the valve guide being shown fragmentarily, partly in axial section and partly in elevation.

Referring to the first embodiment of this invention, and particularly to FIG. 1, the seal 10 comprises a sheet metal (preferably steel), generally cup-shaped shell 12, a sealing element in the form of a flat, centrally apertured disc 14 of suitable flexible material (preferably polytetrafluoroethylene), and a centrally apertured sheet metal (preferably steel) retaining washer 16.

In the course of manufacture, the bottom margin of the shell's cylindrical wall 18 is interiorly cut away or otherwise reduced in thickness to provide a short, initially cylindrical skirt 20 as indicated in broken lines. While the skirt is still in its initial cylindrical form, the disc 14 is pushed upwardly into the shell 12 whereafter the washer 16 is pushed upwardly into place in the shell. If desired, the disc 14 and the washer 16 may be inserted together into the shell.

The washer, preferably, is either a tight fit within the cylindrical wall 18 or is slightly oversize with respect to said wall so that when it is pushed into place with a suitable pushing tool, its outer edge very tightly engages the inner surface of the wall 18 so that the washer holds the sealing disc 14 tightly against the inner surface of the shell's centrally apertured radial wall 22.

By using a pushing tool having a circular end surface of substantially less diameter than the inside diameter of the cylindrical wall 18, an outer marginal portion 24 of a slightly oversize washer 16 becomes deflected downwardly so that a force tending to dislodge the washer from the shell 12 causes the washer's edge to bite into or increase its frictional engagement with the shell's inner surface, thereby holding the washer and the sealing disc 14 firmly against dislodgment from the shell.

After assembly of the shell parts, as just described, the skirt 20 is formed into its full line position of FIG. 1 to convert the skirt into an inturned flange 20a, thereby completing the formation of the seal in readiness for its application to an end portion of a rod or valve stem guide 26.

It will be understood that a lower portion (not shown) of the valve stem guide 26 is integral with or rigidly fixed to an engine block or casing of a related mechanism with which a related reciprocating rod 29 (FIG. 3) functions. The guide 26 is formed with an axial bore 28 for accommodating the rod 29 therewithin, an annular seal-supporting portion 30 of reduced diameter at its upper end, an annular chamfer 32 extending about the top of portion 30, and an external annular groove 34, encircling an area where the reduced portion 30 adjoins the remainder or main body 27 of the rod guide 26.

The seal 10 is applied to the upper end of the rod guide 26 by being pushed downwardly onto the latter. In being thus applied, the seal's flange 20a first engages the rod guide's chamfer 32 as indicated in broken lines in FIG. 2. Continued downward pushing of the seal flexes a lower marginal portion of the shell's wall 18, dilating said marginal portion sufficiently that the edge of flange 20a moves onto cylindrical surface 30a of the guide's seal-supporting portion 30 as shown in full lines in FIG. 2. The steel of the shell wall 18 is of such thinness and resiliency characteristics to permit such dilation.

Figure 3:
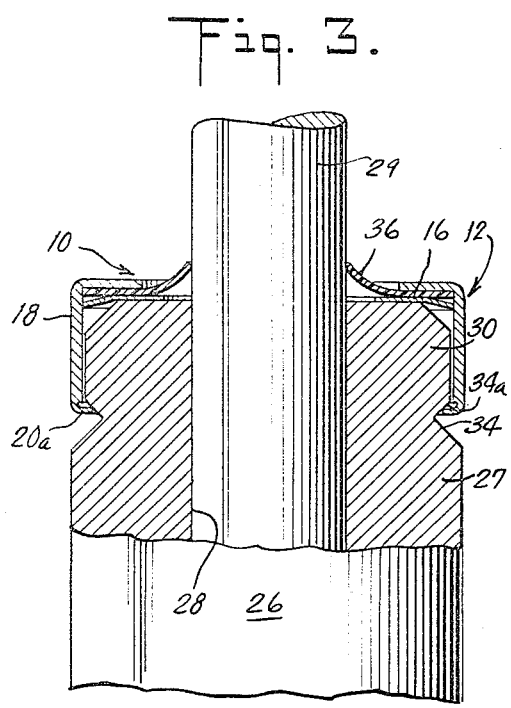
FIG. 3 shows the same parts as in FIGS. 1 and 2, but with the seal fully mounted upon the valve guide; and this figure also includes an elevational, fragmentary showing of an axially shiftable rod or valve stem after the latter has been pushed upwardly in place within the valve guide and the seal.

Further continued downward pushing of the seal brings the flange 20a into alignment with the groove 34 into which said flange snaps as the resiliency of the wall 18 causes the latter to become restored to its normal cylindrical shape as shown in FIG. 3. It is desirable that the dimensions of the portion 30 of the rod guide and of the shell 12 be such that, when the seal has been fully pushed down so that the washer 16 firmly engages the top of the rod guide 26, the edge of the shell's flange 20a firmly engages an upper angular, annular surface 34a of groove 34. The firmness of such engagement may even advantageously be such that the shell's wall 18 remains very slightly dilated and still under dilation tension.

Figure 2:
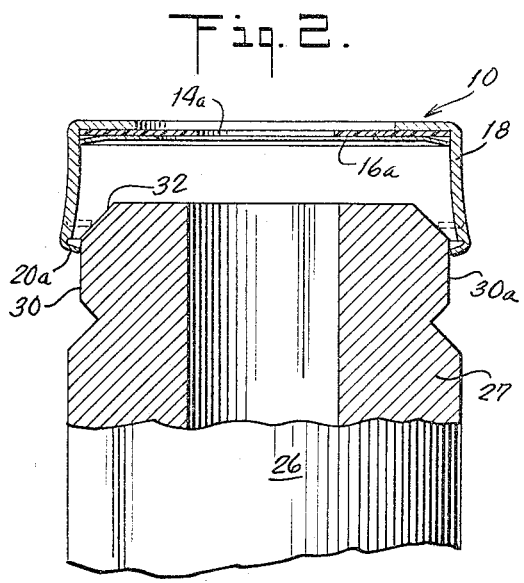
FIG. 2 shows the same parts as in FIG. 1, but with the seal partly pushed down upon the valve guide as in an intermediate stage in the mounting of the seal upon the valve guide.

It may be observed from FIGS. 1 and 2 that the central aperture 14a of the sealing disc 14 is of lesser diameter than the bore 28 of the rod guide and that the central aperture 16a of the washer 16 is of greater diameter than said bore. Thus, in assembling components in many reciprocating rod applications as, for example, with poppet valves, the seal 10 may first be firmly applied to the guide 26 whereafter the rod 29 (the stem of the valve) is inserted into and pushed upwardly in the bore 28. The upwardly pushed rod enters the sealing disc's operture 14a and forcefully expands the inner marginal portion of said disc and flares it upwardly to form a frusto-conical sealing lip 36 extending upwardly and tightly about the rod as an effective means of opposing movement of lubricating fluid and/or foreign matter downwardly along the rod into and beyond the bore 28.

Another way of assembling the described components is to first insert the rod 29 in place within its guide 26 and then push the seal 10 onto the upper end of the rod and slide it downwardly thereon, firmly snapping the seal onto the guide in the manner already described. Under some conditions, the seal may first be slid onto the rod whereafter the latter is inserted downwardly into its guide and the seal snapped into place upon the guide.

The mentioned coaction of the flange 20a with the groove 34 serves to hold the seal 10 very firmly upon the rod guide 26 both during the described insertion of the rod and during operational reciprocation thereof. Also, in the described first embodiment, the reduced diameter of the rod guide's portion 30 enables the use of a seal having a cylindrical wall 18 of no larger outside diameter than the main body portion 27. The latter characteristic is important where the rod guide and seal must be accommodulated freely within a space of small diameter as, for example, within a coil spring (not shown) for operating a poppet valve associated with the rod or valve stem 29.

The second embodiment (FIG. 4) differs from the described first embodiment chiefly in that a centrally apertured sheet metal cup 38 is employed, instead of the washer 16, to hold the sealing disc 14 in place within the shell 12. The cup 38 has an integral cylindrical flange 40, accurately but not necessarily tightly disposed within the cylindrical wall 18 of the shell 12. The cup is of such dimensions that the shell's inturned flange 20a engages the bottom edge of the cup's flange 40 to hold the cup firmly in place and clamp the sealing disc 14 tightly between the shell's radial wall 22 and a radial wall 42 of the cup.

Figure 4:
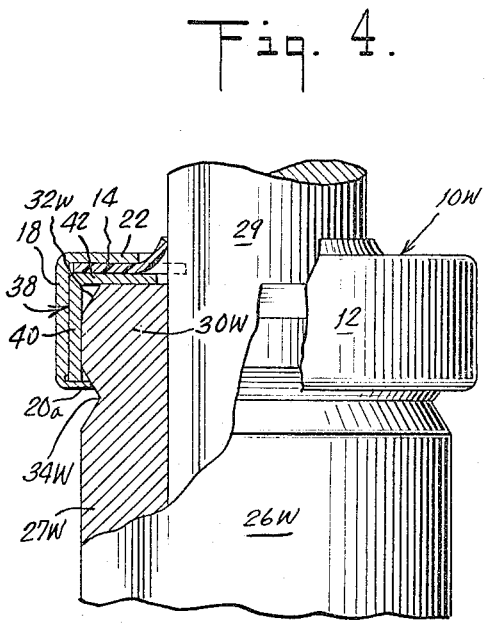
FIG. 4 is a partly broken away view, somewhat similar in character to the showing of the first-mentioned embodiment in FIG. 3, but illustrating a seal and rod guide according to a second embodiment of this invention.

The rod guide 26w shown in FIG. 4 is formed with a chamfer 32w and an annular groove 344w respectively corresponding generally to the chamfer 32 and the groove 34 of the first embodiment, and serving the same purposes. The surface of chamfer 32w and the surfaces of the groove 34w are shown of different angularity than the corresponding surfaces of the first embodiment, thereby indicating considerable latitude in the formations of said chamfer and groove.

It should be noted that the seal-supporting portion 30w of the rod guide in the second embodiment is not reduced in diameter as in the first embodiment so that the seal 10w, as shown in FIG. 4, protrudes laterally beyond the cylindrical surface of the main body portion 27w of the rod guide. The described second embodiment is usable, of course, where space for its accommodation presents no problem. Moreover, it may be employed, even where accommodation space is a problem, by making the rod guide 26w, as a whole, of reduced diameter.

In applying the seal 10w to the rod guide 26w, the lower marginal portion of the cylindrical flange 18 of the shell 12 becomes momentarily dilated similarly to its dilation as described with reference to the first embodiment.

The third embodiment (FIG. 5) differs from the first embodiment only in that its shell 12y has a bottom, inturned flange 20b which is of the same thickness as the remainder of the shell and is of the same angularity as surface 34a of groove 34 of the rod guide. In the application of this seal to rod guide 26, the bottom marginal portion of the shell becomes momentarily dilated as with the first two described embodiments. When the seal is thus mounted upon the rod guide, the flange 20b engages a substantial area of the surface 34a rather than at a circular line engagement therewith.

The fourth embodiment (FIG. 6) is similar in principle but quite different structurally from the first three detailed embodiments. Guide 46, within which rod 29 reciprocates, is generally cylindrical and is formed with a narrow chamfer 48 about its upper end and an external series of fine, closely arranged, individual, circular grooves 50 suitably spaced from the top of the rod guide.

The seal 52 of the fourth embodiment comprises a metal, generally cylindrical shell 54 having a lower, inturned flange or annular lip 56 and an upper, inturned, flat flange 58, the inner edge of which extends inwardly so that the latter flange axially overlies an outer marginal portion of a flat, annular top surface 60 of the rod guide 46.

An annular, flexible sealing element 62 of suitable material such as, for example, rubber or other elastomeric material, is molded and/or bonded into or otherwise mounted in the upper end of the shell 54. This sealing element, prior to the assembly of the illustrated parts, preferably has a frusto-conical sealing lip 64 of an inside diameter less than the diameter of the rod 29, as shown in broken lines in FIG. 6.

The seal 52, the rod guide 46, and the rod 29 may be assembled in the same way as already described with reference to generally corresponding parts of the first three described embodiments. In being thus assembled, the sealing lip 64 becomes expanded by insertion of the rod 29 thereinto and the reaction to such expansion causes said lip to tightly, slidably engage the rod 29. During application of the seal to the rod guide the lower marginal portion of the shell 54 is momentarily dilated by the chamfer 48, and the shell 54 is forcefully pressed downwardly to squeeze an annular portion of the sealing element tightly, as a gasket, between the shell's flange 58 and the top surface 60 of the rod guide. During this downward movement, the shell's flange 56 seats successively in uppermost grooves 50 and remains seated firmly in one of the grooves 50 when the downward pressing of the shell has been completed. Because of the fineness and closeness of said grooves, some one of them will serve as a seat to hold the seal firmly down upon the rod guide.

Noting that, in all the described embodiments, the bottom flange or lip of the metal shell engages an upwardly diverging surface when the seal is in place on the rod guide, it will be realized that, although the seal cannot be dislodged from said guide by the reciprocation of the rod, the seal, nevertheless, may be forcibly pulled from the rod guide by a suitable tool for servicing or replacement.

It will be understood that the concepts described herein may be utilized in various other ways without departing from this invention as set forth in the following claim.

I claim:

1. In combination, a guide sleeve formed with an annular chamfer at one end of said sleeve and a reduced-diameter portion spaced from said one end, a reciprocating rod working in said sleeve, and a seal effective between said sleeve and said rod; said seal comprising a cup-shaped shell having a radial wall formed with a central aperture therein of greater diameter than said rod to enable the latter to reciprocate freely therewithin, and a cylindrical wall one end of which is rigidly integral with the periphery of said radial wall and the other end of which is formed with an inturned annular flange, an annular sealing element disposed in said shell, fixedly and sealingly in relation to said radial wall, and having an inner periphery adapted for sliding sealing engagement with said rod; said cylindrical wall having a cylindrically continuous resilient, marginal portion at its said other end, including said annular flange, the resiliency of said marginal portion being sufficient to enable said marginal portion to become dilated in coaction with said chamfer during application of the seal upon said sleeve and to contract from such dilated condition to cause said inturned flange to seat in said reduced-diameter portion of the guide sleeve whereby to cause the seal to be held securely upon said sleeve, further including a retaining washer of thin, resilient metal, tightly seated against an outer peripheral portion of the sealing element, holding the sealing element in place between said washer and said radial wall of the shell; said washer having an outer marginal portion flexed axially outwardly of the shell and tightly engaging the inner surface of the latter's cylindrical wall at an oblique angle, to hold the sealing element and said washer against dislodgement from the shell.

References Cited

UNITED STATES PATENTS

| 1,481,562 | 1/1924  | Rowe          | 123—188  |
| 2,157,865 | 5/1939  | Robertson et al. | 123—188  |
| 2,157,867 | 5/1939  | Robertson et al. | 123—188  |
| 2,808,277 | 10/1957 | Binder        | 308—3.5  |
| 3,025,113 | 3/1962  | Helwig        | 308—36.1 |

LAVERNE D. GEIGER, *Primary Examiner.*

J. S. MEDNICK, *Assistant Examiner.*